United States Patent
Hu

(10) Patent No.: US 11,137,643 B2
(45) Date of Patent: Oct. 5, 2021

(54) OPTICAL COMPONENT FOOL-PROOF STRUCTURE FOR BACKLIGHT MODULE AND DISPLAY PANEL

(71) Applicants: CHONGQING ADVANCE DISPLAY TECHNOLOGY RESEARCH, Chongqing (CN); CHONGQING HKC OPTOELECTRONICS TECHNOLOGY CO., LTD., Chongqing (CN)

(72) Inventor: Xiaogang Hu, Chongqing (CN)

(73) Assignees: CHONGQING ADVANCE DISPLAY TECHNOLOGY RESEARCH, Chongqing (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 134 days.

(21) Appl. No.: 16/463,377

(22) PCT Filed: Nov. 9, 2018

(86) PCT No.: PCT/CN2018/114689
§ 371 (c)(1),
(2) Date: May 23, 2019

(87) PCT Pub. No.: WO2020/087560
PCT Pub. Date: May 7, 2020

(65) Prior Publication Data
US 2020/0333665 A1 Oct. 22, 2020

(30) Foreign Application Priority Data

Oct. 30, 2018 (CN) .......................... 201821774482.6

(51) Int. Cl.
*G02F 1/13357* (2006.01)
*F21V 8/00* (2006.01)

(52) U.S. Cl.
CPC ..... *G02F 1/133608* (2013.01); *G02B 6/0088* (2013.01)

(58) Field of Classification Search
CPC ... G02F 1/133608; G02F 2001/133322; G02F 1/133322; G02B 6/0088
See application file for complete search history.

(56) References Cited

U.S. PATENT DOCUMENTS

2006/0007367 A1* 1/2006 Cho .................. G02F 1/133308
349/58
2006/0028836 A1* 2/2006 Shin ...................... G02B 6/009
362/600

(Continued)

FOREIGN PATENT DOCUMENTS

CN 1971371 A 5/2007
CN 103062675 A 4/2013

(Continued)

OTHER PUBLICATIONS

Fu, Backlight Module, 2018, Espacenet, https://worldwide.espacenet.com/patent/search/family/061514594/publication/CN207067609U (Year: 2018).*

(Continued)

*Primary Examiner* — Rajarshi Chakraborty
*Assistant Examiner* — Michael Chiang

(57) ABSTRACT

The present disclosure provides a backlight module and a display panel. The backlight module includes a back plate and an optical component fixed on the back plate. A fool-proof structure is disposed on the optical component. The fool-proof structure includes a bulge. The bulge is disposed on a surface of the optical component. The surface of the optical component is matched and fixed with the back plate.

(Continued)

A Positioning structure matched and fixed with the fool-proof structure is disposed on the back plate.

13 Claims, 4 Drawing Sheets

(56) References Cited

U.S. PATENT DOCUMENTS

| | | | | |
|---|---|---|---|---|
| 2013/0208504 A1* | 8/2013 | Huang | ................. | G02B 6/0088 |
| | | | | 362/609 |
| 2017/0160464 A1* | 6/2017 | Choi | ..................... | G02B 6/0088 |
| 2017/0292691 A1* | 10/2017 | Coo | ..................... | H05K 5/0017 |
| 2019/0163019 A1* | 5/2019 | Yen | ................... | G02F 1/133524 |
| 2019/0204660 A1* | 7/2019 | Maemuko | ......... | G02F 1/133308 |

FOREIGN PATENT DOCUMENTS

| | | | |
|---|---|---|---|
| CN | 203298101 U | | 11/2013 |
| CN | 207067583 U | | 3/2018 |
| CN | 207067609 U | * | 3/2018 |
| CN | 207067609 U | | 3/2018 |
| KR | 20130001592 U | | 3/2013 |

OTHER PUBLICATIONS

International Search Report issued in corresponding International application No. PCT/CN2018/114689, dated Jul. 30, 2019.
Written Opinion of the International Searching Authority for No. PCT/CN2018/114689.

* cited by examiner

OPTICAL COMPONENT FOOL-PROOF STRUCTURE FOR BACKLIGHT MODULE AND DISPLAY PANEL The present application claims foreign priority to Chinese Patent Application No. CN201821774482.6, titled: BACKLIGHT MODULE AND DISPLAY PANEL, filed on Oct. 30, 2018 in the State Intellectual Property Office of China, and the entire contents of which is hereby incorporated by reference.

TECHNICAL FIELD

The present disclosure relates to a field of display technology, and in particular, to a backlight module and a display panel.

BACKGROUND

The statements herein merely provide background information related to the present disclosure and do not necessarily constitute the prior art.

With the development and advancement of technology, flat panel displays have become mainstream products of displays because of their thin bodies, low power consumption and low radiation, and have been widely used. The flat panel displays include thin film transistor-liquid crystal display (TFT-LCD), organic light-emitting diode (OLED) displays, and etc. The TFT-LCD controls a rotation direction of liquid crystal molecules to refract light of a backlight module to produce frames. The TFT-LCD has many advantages such as having a thin body, saving power, and no radiation. The OLED display is made of an organic electroluminescent diode, and has many advantages such as self-illumination, short response time, and high definition and contrast, and flexible display and large-area full-color display.

In the liquid crystal display industry, in an assembly process of an optical component reflector, a light guide plate (LGP) and an optical sheet, there are currently ear-hook fool-proof structure, inverted C-angle fool-proof structure and slotting on the plastic frame fool-proof structure. However, the backlight structures tend to achieve a single direction of being fool proof.

SUMMARY

The technical problem to be solved by the present disclosure is to provide a backlight module and a display panel to achieve full-scale fool proof during the installation process of the backlight module.

To achieve the above objective, the present disclosure provides a backlight module, comprises:
a back plate; and
an optical component fixed on the back plate.

A fool-proof structure is disposed on the optical component, and the fool-proof structure comprises a bulge. The bulge is disposed on a surface of the optical component, and the surface of the optical component is matched and fixed with the back plate. A positioning structure matched and fixed with the fool-proof structure is disposed on the back plate.

Optionally, a height of the bulge is no more than a thickness of the back plate.

Optionally, the optical component comprises a main plate and support plates. The support plate protrudes from a side end of the main plate. And the support plates are symmetrically disposed on two side ends of the main plate. The fool-proof structure is disposed on the support plate.

Optionally, the fool-proof structure comprises a first recess and a first boss. The first boss and the first recess are parallelly disposed. The positioning, structure comprises a second boss and a second recess, where the second boss and the second recess are parallelly disposed. The first recess is matched and fixed with the second boss. The first boss is matched and fixed with the second recess.

Optionally, the main plate comprises a first end and a second end, where the first end of the main plate corresponds to a mounting starting end of the optical component, and the second end of the main plate corresponds to a mounting tail end of the optical component. The support plates are disposed on the first end of the lain plate.

Optionally, the fool-proof structure is matched and fixed with the positioning structure, and the fool-proof structure is gap-less fitted with and the positioning structure. The first boss and the second boss comprise first chamfers, the first chamfers are disposed on a top end of the first boss and a top end of the second boss. The first chamfer is slanted from the top end to the side end.

Optionally, a height of the first boss is no more than a depth of the second recess.

Optionally, a height of the second boss is no more than a depth of the first recess.

The present disclosure further provides a backlight module comprises:
a back plate; and
an optical component fixed on the back plate.

The fool-proof structure is disposed on the optical component, and the fool-proof structure comprises a bulge. The bulge is disposed on a surface of the optical component, and the surface of the optical component is matched and fixed with the back plate.

A positioning structure matched and fixed with the fool-proof structure is disposed on the back plate.

A height of the bulge is no more than a thickness of the back plate.

The optical component comprises a main plate and support plates.

The support plate protrudes from a side end of the main plate, and the support plates are symmetrically disposed on two side ends of the main plate.

The fool-proof structure is disposed on the support plate.

The main plate comprises a first end and a second end. The first end of the main plate corresponds to a mounting starting end of the optical component, and the second end of the main plate corresponds to a mounting tail end of the optical component. The support plates are disposed on the first end of the main plate.

The support plates are symmetrically disposed on two side ends of the main plate.

The fool-proof structure comprises a first recess and a first boss. The first boss and the first recess are parallelly disposed.

The positioning structure comprises a second boss and a second recess. The second boss and the second recess me parallelly disposed.

The first recess is matched and fixed with the second boss. The first boss is matched and fixed with the second recess.

The first recess is a through hole.

A height of the first boss is equal to a depth of the second recess.

A height of the second boss is equal to a depth of the first recess.

The fool-proof structure is matched and fixed with the positioning structure, and the fool-proof structure is gap-less fitted with the positioning structure.

The present disclosure further provides a display panel. The display panel comprises a backlight module. The backlight module comprises:

a back plate; and an optical component fixed on the back plate;

A fool-proof structure is disposed on the optical component, and the fool-proof structure comprises a bulge. The bulge is disposed on a surface of the optical component, and the surface of the optical component is matched and fixed with the back plate.

A positioning structure matched and fixed with the fool-proof structure is disposed on the back plate.

Optionally, a height of the bulge is no more than a thickness of the back plate.

Optionally, the optical component comprises a main plate and support plates. The support plate protrudes from a side end of the main plate. And the support plates are symmetrically disposed on two side ends of the main plate. The fool-proof structure is disposed on the support plate.

Optionally, the fool-proof structure comprises a first recess and a first boss. The first boss and the first recess are parallelly disposed. The positioning structure comprises a second boss and a second recess, where the second boss and the second recess are parallelly disposed. The first recess is matched and fixed with the second boss. The first boss is matched and fixed with the second recess.

Optionally, the main plate comprises a first end and a second end, where the first end of the main plate corresponds to a mounting starting end of the optical component, and the second end of the main plate corresponds to a mounting tail end of the optical component. The support plates are disposed on the first end of the main plate.

Optionally, the fool-proof structure is matched and fixed with the positioning structure, and the fool-proof structure is gap-less fitted with the positioning structure. The first boss and the second boss comprise first chamfers, the first chamfers are disposed on a top end of the first boss and a top end of the second boss. The first chamfer is slanted from the top end to the side end.

Optionally, a height of the first boss is no more than a depth of the second recess.

Optionally, a height of the second boss is no more than a depth of the first recess.

The present disclosure considers that a fixing process of the backlight module is to fix the optical component to the back plate, and a back surface and a front surface of the optical component look similar, which makes the optical component often reversed during installation and reduces a working efficiency. Thus, the present disclosure provides the fool-proof structure including a bulge, where the fool-proof structure is disposed on the surface of the optical component, and the surface of the optical component is matched and fixed with the back plate. Because the optical component is gap-less fitted with the back plate after installed, the fool-proof structure is hidden therein and will not occupy extra space. The fool-proof structure including a bulge is disposed on one side of the optical component, a mounting worker can clearly distinguish the front surface and the back surface at a glance. Further, the fool-proof structure matched and fixed with the positioning structure is disposed on the back plate, and the fool-proof structure is correspondingly matched and fixed with the positioning structure, thus the fool-proof structure realizes alignment placement of an installation direction of the optical component, thereby playing a positioning role and greatly improving an installation efficiency of the backlight module.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently; the drawings in the following description are merely some of the embodiments of the present disclosure, and those skilled in the art are able to obtain other drawings according to the drawings without contributing any inventive labor. In the drawing.

DETAILED DESCRIPTION

Figure 1:
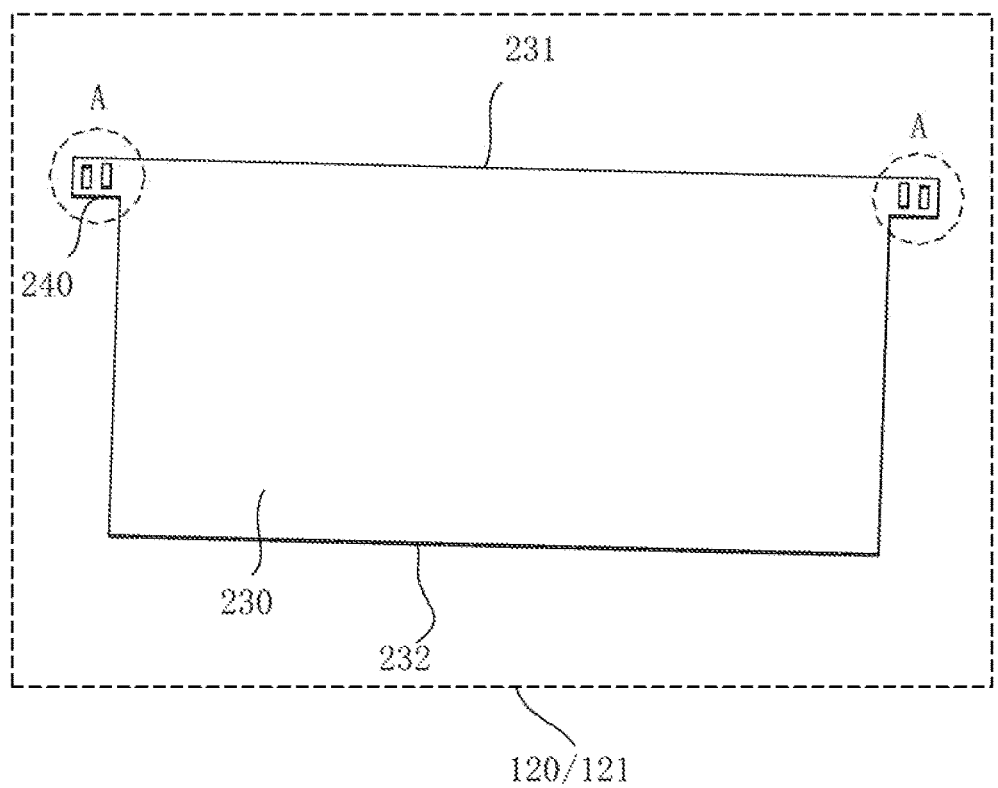
FIG. 1 is a schematic structural diagram of an optical film according to an embodiment of the present disclosure.

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relations dips shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

In the drawings, structurally similar elements are denoted by the same reference numerals.

Figure 2:
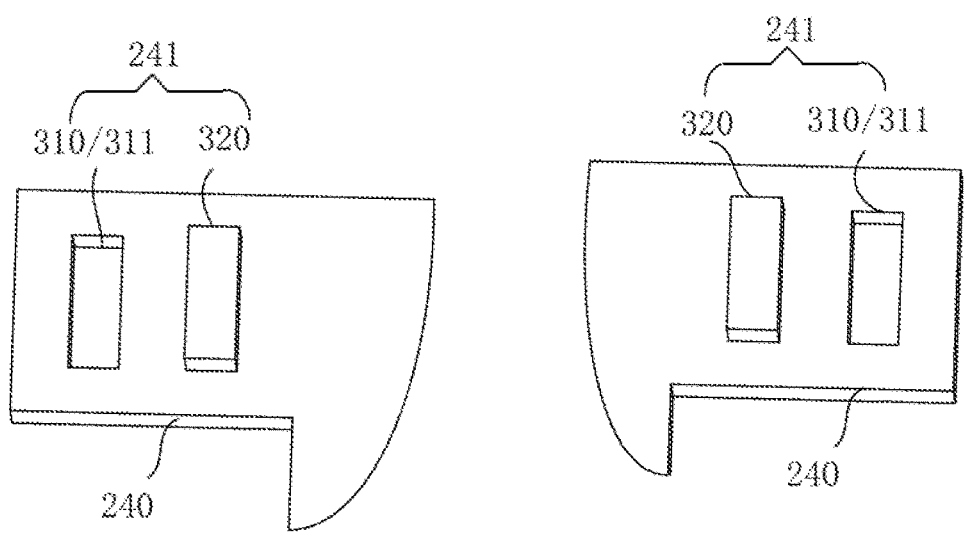
FIG. 2 is a schematic diagram of a support plate of an optical film according to an embodiment of the present disclosure.
Figure 3:
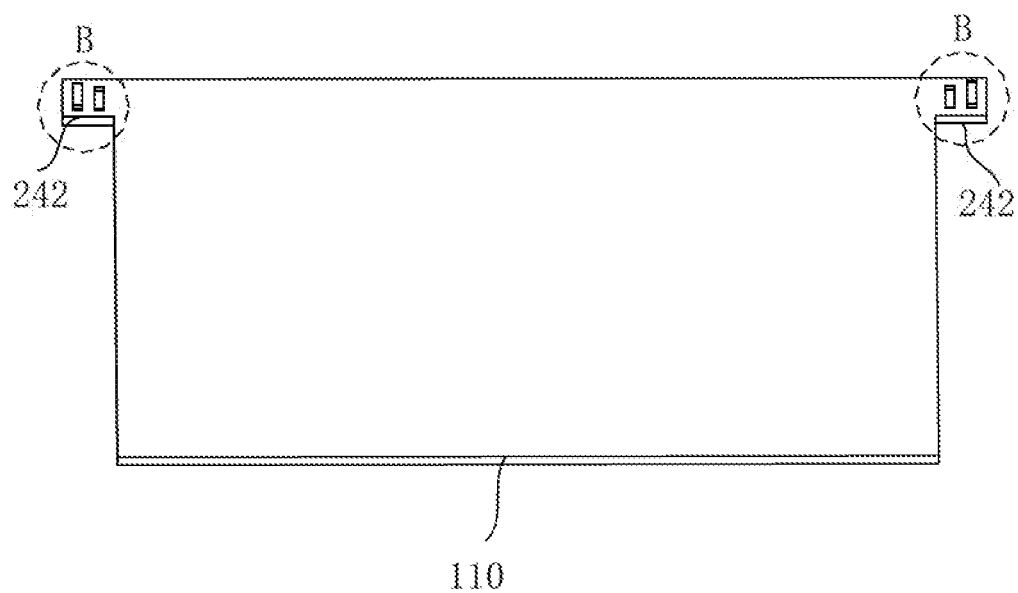
FIG. 3 is a schematic structural diagram of a back plate according to an embodiment of the present disclosure.
Figure 4:
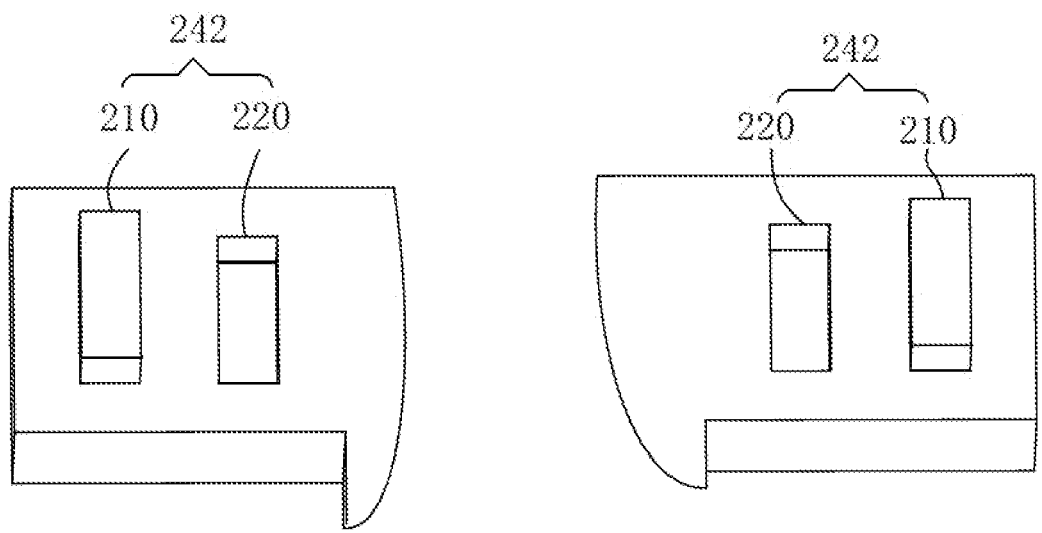
FIG. 4 is a schematic diagram of a positioning structure of a back plate according to an embodiment of the present disclosure.
Figure 5:
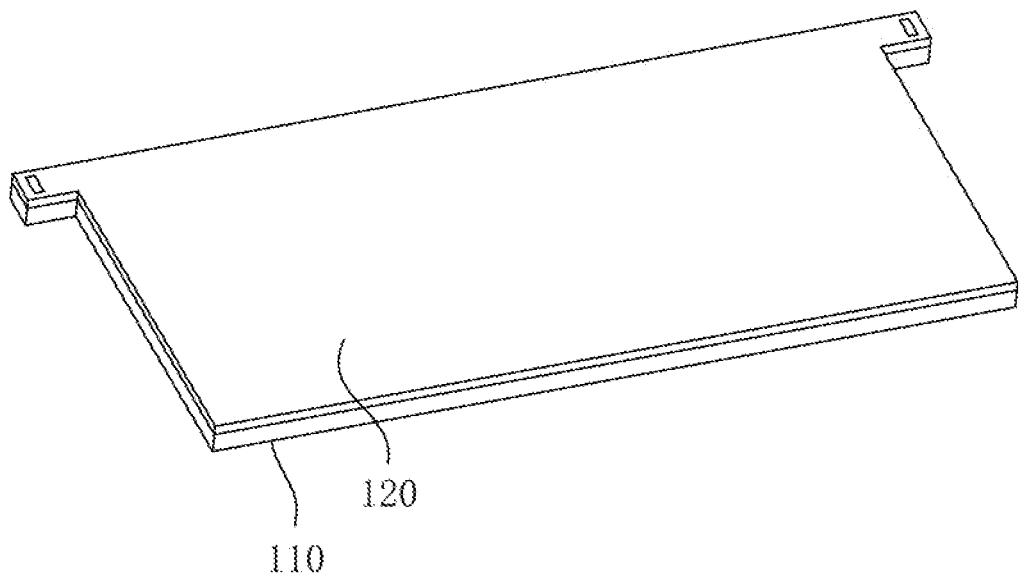
FIG. 5 is a schematic diagram of a back plate and an optical film after installation according to an embodiment of the present disclosure.
Figure 6:
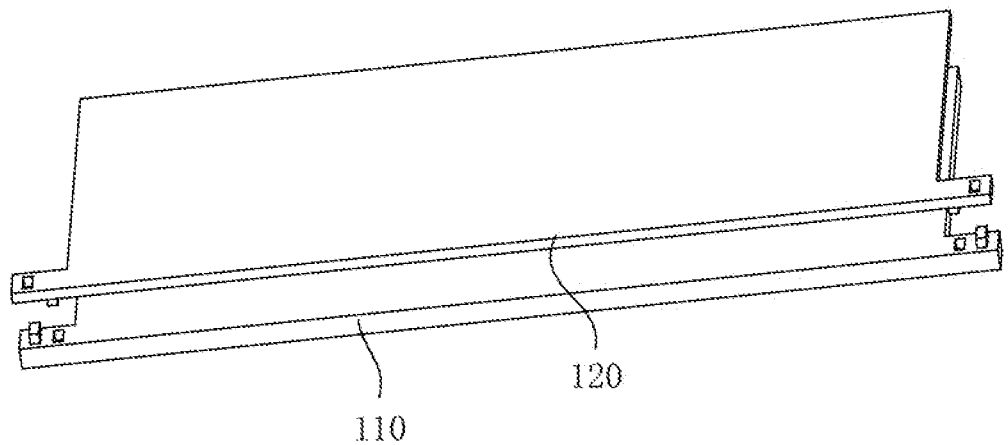
FIG. 6 is a schematic diagram of a back plate and an optical film during installation according to an embodiment of the present disclosure.
Figure 7:
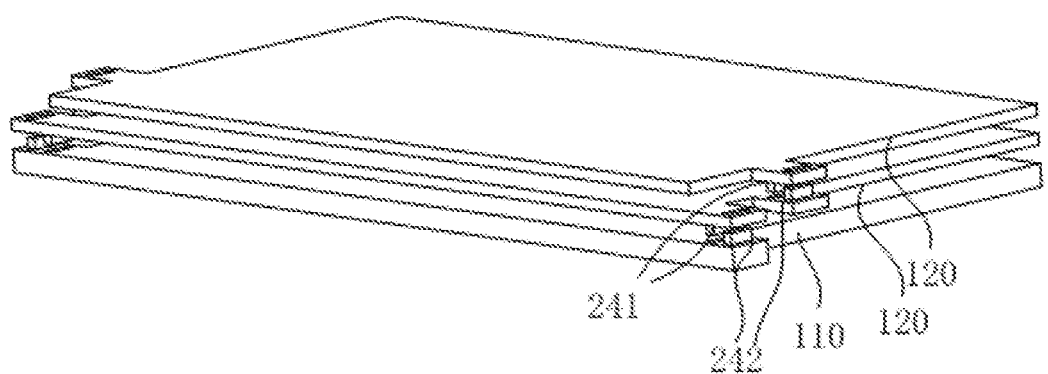
FIG. 7 is a schematic diagram of a back plate and a multi-layer optical turn during installation according to an embodiment of the present disclosure.
Figure 8:
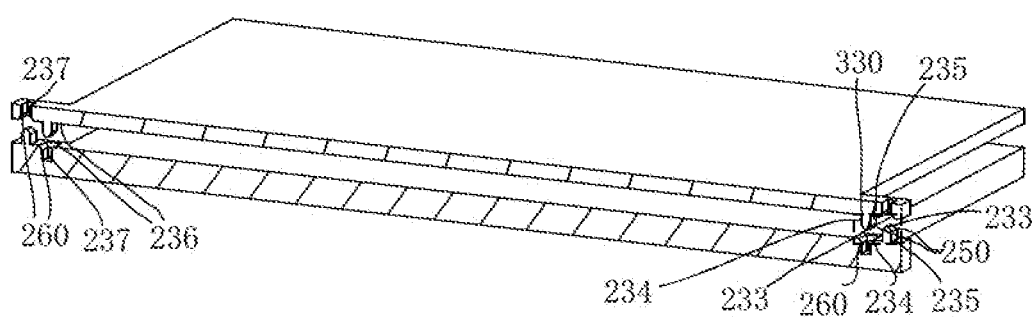
FIG. 8 is a schematic cross-sectional diagram of a positioning structure having a chamfered design and a fool-proof structure after installation according to an embodiment of the present disclosure.

As shown in FIG. 1 to FIG. 7, the embodiments further describe a backlight module and a display panel of the present disclosure in detail.

A backlight module comprises a back plate 110 and an optical component 120. The optical component 120 is fixed on the back plate 110. A fool-proof structure 241 is disposed on the optical component 120, and the fool-proof structure 241 comprises a bulge 330. The bulge 330 is disposed on a surface of the optical component 120, and the surface of the optical component 120 is matched and fixed with the back plate 110. A positioning structure 242 matched and fixed with the fool-proof structure 241 is disposed on the back plate 110.

In this embodiment, the present disclosure considers that a fixing process of the backlight module 100 is to fix the optical component 120 to the back plate 110, and a back surface and a front surface of the optical component 120 look similar, which makes the optical component 120 often reversed during installation and reduces a working efficiency. Thus, the present disclosure provides the fool-proof structure 241 including a bulge 330, where the fool-proof structure 241 is disposed on the surface of the optical component 120, and the surface of the optical component 120 is matched and fixed with the back plate 110. Because the optical component 120 is gap-less fitted with the back plate 110 after installed, the fool-proof structure 241 is hidden therein and will not occupy extra space. The fool-proof structure 241 including a bulge 330 is disposed on one side of the optical component 120, a mounting worker can clearly distinguish the front surface and the back surface at a glance. Further, the positioning structure 242 matched and fixed with the fool-proof structure 241 is disposed on the back plate 110, and the fool-proof structure 241 is correspondingly matched and fixed with the positioning structure 242, thus the fool-proof structure 241 realizes alignment placement of an installation direction of the optical component 120, thereby playing a positioning role and greatly improving an installation efficiency of the backlight module 100.

The optical component 120 is selected from a reflection sheet, a light guide plate, a polarizer, an optical film 121, and the like. Unless otherwise specified, the optical film 121 will be described as an example in the following embodiments.

In an embodiment, a height of the bulge 330 is no more than a thickness of the back plate 110.

In this embodiment, it is required to have certain firmness after the optical film 121 is installed on the back plate 110. If the height of the bulge 330 is greater than the thickness of the back plate 110, the fool-proof structure 241 will protrude through the back plate 110 and protrude from the back plate 110, which is not only unsightly, but also is easily to touch a protruding portion of the fool-proof structure 241 during use, further affects the optical film 121, and even damage the optical film 121 in severe cases. Thus, the height of the bulge 330 is designed to be no more than the thickness of the back plate 110.

In an embodiment the optical film 121 comprises a main plate 230 and support plates 240. The support plate 240 protrudes from a side end of the main plate 230. And the support plates 240 are symmetrically disposed on two side ends of the main plate 230. The fool-proof structure 241 is disposed on the support plate 240.

In this embodiment, it is considered that the optical film 121 is generally in a regular shape, and each part of the optical film 121 has a certain function of display. In order not to affect the function of the optical component 120, the optical film 121 designed by the present disclosure comprises the main plate 230 and the support plates 240. The support plate 240 is an extended segment of the main plate 230, and the main plate 230 is configured to realize the display function of the optical film 121, and the support plate 240 is configured to realize an installation positioning of the optical film 121 and a fool-proof function of the optical film 121. The fool-proof structure 241 is disposed on the support plate 240, so that the fool-proof structure 241 does not occupy a functional position of the main plate 230, and does not affect a normal use of the optical film 121. Moreover, the support plate 240 and the fool-proof structure 241 are simple to manufacture and cost-effectively. According to a principle that two points define a straight line, when the optical film 121 is installed on the back plate 110, the fool-proof structure 241 need to play a uniqueness to the installation. And after installation, uniformity of the positioning function of the fool-proof structure 241 on the optical film 121 should be met. Thus, in this embodiment, the support plates 240, acting as a carrier of the fool-proof structures 241, are designed to be disposed on both sides of the main plate 230, and are symmetrically disposed respect to the main plate 230, which satisfies the uniqueness of being fool-proof, and makes an overall fixing effect of the optical film 121 after installation to be symmetrical and uniform.

In an embodiment, the fool-proof structure 241 comprises a first recess 310 and a first boss 320. The first boss 320 and the first recess 310 are parallelly disposed. The positioning structure 242 comprises a second boss 210 and a second recess 220, where the second boss 210 and the second recess 220 are parallelly disposed. The first recess 310 is matched and fixed with the second boss 210. The first boss 320 is matched and fixed with the second recess 220.

In this embodiment, the positioning structure 242 disposed on the back plate 110 and the fool-proof structure 241 disposed on the optical film 121 both comprise bosses and recesses, thus, the fool-proof structure 241 disposed on each support plate 240 constitutes a USB-like structure. Correspondingly, the positioning structure 242 disposed on the back plate 110 also constitutes a USB-like structure corresponding to the fool-proof structure 241. Because the USB-like structure not only realizes an up and down fool-proof function, but also realizes a left and right fool-proof function. A zero error occurs when installing the reflection sheet, the light guide plate or the optical film, which not only improves the work efficiency, but also greatly increases yield of products.

In an embodiment, the main plate 230 comprises a first end 231 and a second end 232, where the first end 231 of the main plate 230 corresponds to a mounting starting end of the optical film 121, and the second end 232 of the main plate 230 corresponds to a mounting tail end of the optical film 121. The support plates 240 are disposed on the first end 231 of the main plate 230.

In this embodiment, when installing the optical film 121, the mounting starting end of the optical film 121 is aligned with an end of the back plate 110 firstly, and then gradually adhered the optical film 121 and the back plate 110, and finally, the tail end of the optical film 121 and another end of the back plate 110 are aligned to complete the installation. Considering that the fool-proof structure 241 plays a fool-proof and positioning function on the installation of the optical film 121, it is necessary to align the fool-proof structure 241 from a beginning of the installation during the installation of the optical film 121, which improves an installation accuracy and efficiency. Thus, the support plate 240 is designed to be disposed on the mounting starting end of the main plate 230 to facilitate the installation of the optical film 121.

Moreover, the support plate 240 is able to be disposed between the mounting starting end of the main plate 230 and the mounting tail end of the main plate 230, which also plays the fool-proof and positioning function between the optical component 120 and the back plate 110.

In an embodiment, the fool-proof structure 241 is matched and fixed with the positioning structure 242, and the fool-proof structure 241 is gap-less fitted with the positioning structure 242. The first boss 320 and the second boss 210 comprise first chamfers 250, the first chamfers 250 are disposed on a top end of the first boss 320 and a top end of the second boss 210. The first chamfer 250 is slanted from the top end to the side end.

In this embodiment, considering that the fool-proof structure 241 is matched with the positioning structure 242 to limit the position of the optical film 121. Otherwise, the optical film 121 is insecure after installation. Thus, by size design, the fool-proof structure 241 is gap-less fitted with the positioning structure 242, which makes the optical film 121 having no movement space after installation except for the installation direction. Because the gap-less fitted is difficult to install at the beginning, in order to facilitate a match between the foolproof structure 241 and the positioning structure 242, the first chamfers 250 are disposed on the top end of the first boss 320 and the top end of the second boss 210. And the first chamfer 250 is slanted from the top end to the side end. Thus, the first chamfers 250 contact with the first recess 310 and the second recess 220 firstly, which guides the first boss 320 and the second boss 210 to install, and reduces a resistance of installation.

In an embodiment, the first recess 310 and the second recess 220 comprise second chamfers 260. The second chamfers 260 are disposed on an open end of the side where the recess matched with the boss. The second chamfer 260 is slanted from an outer side to an inner side.

In this embodiment, considering that the fool-proof structure 241 is matched with the positioning structure 242, and the fool-proof structure 241 is gap-less fitted with the positioning structure 242. Because the gap-less fit is difficult to install at the beginning, in order to facilitate the match between the fool-proof structure 241 and the positioning structure 242, the second chamfers 260 are disposed on the open end of the side where the recess matched with the boss, and the second chamfer 260 is slanted from an outer side to an inner side. Thus, the second chamfers 260 contact with the first boss 320 and the second boss 210 firstly, which guides the first boss 320 and the second boss 210 to install, and reduces a resistance of installation.

In an embodiment, a height of the first boss 320 is no more than a depth of the second recess 220.

In this embodiment, the back plate 110 is a substrate of the backlight module 100, and the back plate 110 supports and protects the optical film 121. Thus, the height of the first boss 320 disposed on the optical film 121 is no more than the depth of the second recess 220. In this way, the positioning function can be performed, and the first boss 320 is hidden inside the back plate 110 alter installed, which is free from external influences, plays the positioning role, and makes an overall feeling stronger.

In an embodiment, a height of the second boss 210 is no more than a depth of the first recess 310.

In this embodiment, both of the positioning structure 242 disposed on the back plate 110 and the fool-proof structure 241 disposed on the optical film 121 are USB-like structure. The fool-proof structure 241 and positioning structure 242 should not affect normal function of the optical film 121, and because multi-layer optical films 121 are usually stacked on the back plate 110, thus, the height of the second boss 210 is no more than the depth of the first recess 310, so that the second boss 210 does not protrude through the optical film 121, and does not affect installations of other layers of optical films 121.

In an embodiment, the positioning structures 242 having recesses are disposed on an opposite surface of a surface of the optical film 121 disposed on the side of the back plate 110.

In this embodiment, it is considered that the backlight module 100 comprises a plurality of optical films 121, and the optical films 121 are stacked to install, which requires to play the positioning and fool-proof on each optical film 121 during installing. Thus, the positioning structures 242 having recesses are designed to be disposed on an opposite surface of a surface of the optical film 121 disposed on the side of the back plate 110, so that a next optical film 121 having raised fool-proof structures 241 is installed on the fixed optical film 121 to achieve the fool-proof and positioning function.

In an embodiment, a position of the raised fool-proof structures 241 disposed on the optical films 121 is different between different optical films 121.

In this embodiment, since the optical films 121 are stacked, if the positions of the raised anti-snagging structures 241 disposed on different optical films 121 are the same, then the recessed positioning structures 242 disposed on the optical film 121 are correspondingly the same. And the positioning structures 242 disposed on the optical film 121 are relatively weak and easily damaged by force. Moreover, all of the fool-proof structures 241 of the optical films 121 are acted on a straight line, and the closer the optical film 121 to the back plate 110, the greater probability that the fool-proof structures 241 of the optical film 121 are damaged. Thus, the position of the raised fool-proof structures 241 disposed on the optical films 121 is designed to be different between different optical films 121.

As shown in FIG. 1 to FIG. 6, the present disclosure further provides a backlight module 100 comprises a back plate 110 and an optical component 120 fixed on the back plate 110. A fool-proof structure 241 is disposed on the optical component 120, and the fool-proof structure 241 comprises a bulge 330. The bulge 330 is disposed on a surface of the optical component 120, and the surface of the optical component 120 is matched and fixed with the back plate 110. A positioning structure 242 matched and fixed with the fool-proof structure 241 is disposed on the back plate 110. A height of the bulge 330 is no more than a thickness of the back plate 110. The optical component 120 comprises a main plate 230 and support plates 240. The support plate 240 protrudes from a side end of the main plate 230, and the support plates 240 are symmetrically disposed on two side ends of the main plate 230. The fool-proof structure 241 is disposed on the support plate 240. The main plate 230 comprises a first end 231 and a second end 232. The first end 231 of the main plate 230 corresponds to a mounting starting end of the optical component 120, and the second end 232 of the main plate 230 corresponds to a mounting tail end of the optical component 120. The support plates 240 are disposed on the first end 231 of the main plate 230. And the support plates 240 are symmetrically disposed on two side ends of the main plate 230. The fool-proof structure 241 comprises a first recess 310 and a first boss 320. The first boss 320 and the first recess 310 are parallelly disposed. The positioning structure 242 comprises a second boss 210 and a second recess 220. The second boss 210 and the second recess 220 are parallelly disposed. The first recess 310 is matched and fixed with the second boss 210. The first boss 320 is matched and fixed with the second recess 220. The first recess 310 is a through hole 311. A height of the first boss 320 is equal to a depth of the second recess 220. A height of the second boss 210 is equal to a depth of the first recess 310. The fool-proof structure 241 is matched and fixed with the positioning structure 242, and the fool-proof structure 241 is gap-less fitted with the positioning structure 242.

In this embodiment, the present disclosure considers that a fixing process of the backlight module 100 is to fix the optical film 121 to the back plate 110, and a back surface and a front surface of the optical film 121 look similar, which makes the optical film 121 often reversed during installation and reduces a working efficiency. Thus, the present disclosure provides the fool-proof structure 241 disposed on the surface of the optical film 121, and the surface of the optical film 121 is matched and fixed with the back plate 110. Because the optical film 121 is gap-less fitted with the back plate 110 after installed, the fool-proof structure 241 is hidden therein and will not occupy extra space. Further, the positioning structure 242 matched and fixed with the fool-proof structure 241 is disposed on the back plate 110, and the fool-proof structure 241 is correspondingly matched and fixed with the positioning structure 242, thus the fool-proof structure 241 realizes alignment placement of an installation direction of the optical film 121, thereby playing a positioning role and greatly improving an installation efficiency of the backlight module 100. Considering that it is required to have certain firmness after the optical film 121 is installed on the back plate 110. if the height of the bulge 330 is greater than the thickness of the back plate 110, the fool-proof structure 241 will protrude through the back plate 110 and protrude from the back plate 110, which is not only unsightly, but also is easily to touch a protruding portion of the fool-proof structure 241 during use, further affects the optical film 121, and even damage the optical film 121 in severe cases. Thus, the height of the bulge 330 is designed to be no more than the thickness of the back plate 110. Considering that the optical film 121 is generally in a regular shape, and each part of the optical film 121 has a certain function of display. In order not to affect a function of the optical component 120, the optical film 121 designed by the present disclosure comprises the main plate 230 and the support plate 240. The support plate 240 is an extended segment of the main plate 230, and the main plate 230 is configured to realize the display function of the optical film 121, and the support plate 240 is configured to realize an installation positioning of the optical film 121 and a fool-proof function of the optical film 121. The fool-proof structure 241 is disposed on the support plate 240, so that the fool-proof structure 241 does not occupy a functional position of the main plate 230, and does not affect a normal use of the optical film 121. Moreover, the support plate 240 and the fool-proof structure 241 are simple to manufacture and cost-effective. According to the principle that two points defines a straight line, when the optical film 121 is installed on the back plate 110, the fool-proof structure 241 need to play a uniqueness to the installation. And after installation, uniformity of the positioning function of the fool-proof structure 241 on the optical film 121 should be met. Thus, in this embodiment, the support plates 240, acting as a carrier of the fool-proof structures 241, are designed to be disposed on both sides of the main plate 230, and are symmetrically disposed respect to the main plate 230, which satisfies the uniqueness of being fool-proof, and makes the overall fixing effect of the optical film 121 after installation to be symmetrical and uniform. The positioning structure 242 disposed on the back plate 110 and the fool-proof structure 241 disposed on the optical film 120 both comprise bosses and recesses, thus, the fool-proof structure 241 disposed on each support plate 240 constitutes a USB-like structure. Correspondingly, the positioning structure 242 disposed on the back plate 110 also constitutes a USB-like structure corresponding to the fool-proof structure 241. Because the USB-like structure not only realizes an up and down fool-proof function, but also realizes a left and right fool-proof function. A zero error occurs when installing the reflection sheet, the light guide plate or the optical film, which not only improves the work efficiency, but also greatly increases yield of products. When installing the optical film 121, the mounting starting end of the optical film 121 is aligned with au end of the back plate 110 firstly, and then gradually adhered the optical film 121 and the back plate 110, and finally, the tail end of the optical film 121 and another end of the back plate 110 are aligned to complete the installation. Considering that the fool-proof structures 241 play a fool-proof and positioning function on the installation of the optical film 121, it is necessary to align the fool-proof structure 241 from a beginning of the installation during the installation of the optical film 121, which improves the installation accuracy and efficiency. Thus, the support plate 240 is designed to be disposed on the mounting starting end of the main plate 230 to facilitate the installation of the optical film 121. In view of the fact that the optical film 121 is relatively thin, if the depth of the first recess 310 is shallow, the match and fixation between the second boss 210 and the first recess 310 may be weak. Thus, the first recess 310 is designed to be a through hole 311, such that the depth of the first recess 310 reaches a maximum, and the maximum stable state is obtained after the second boss 210 matched and fixed with the first recess 310.

The back plate 110 is a substrate of the backlight module 100, and the back plate 110 supports and protects the optical film 121. Thus, the height of the first boss 320 is equal to the depth of the second recess 220. In this way, the positioning function can be performed, and the first boss 320 does not protrude from the back plate 110 after installed, which is free from external influences, plays the positioning role, and makes an overall feeling stronger. Both of the positioning structure 242 disposed on the back plate 110 and the fool-proof structure 241 disposed on the optical film 121 are USB-like structure. The fool-proof structure 241 and positioning structure 242 should not affect normal function of the optical film 121, and because multi-layer optical films 121 are usually stacked on the back plate 110, thus, the height of the second boss 210 is equal to the depth of the first recess 310, so that the second boss 210 does not protrude through the optical film 121, and does not affect mountings of other layers of optical films 121. Considering that the fool-proof structure 241 is matched with the positioning structure 242 to limit the position of the optical film 121. Otherwise, the optical film 121 is insecure after installation. Thus, by size design, the fool-proof structure 241 is gap-less fitted with the positioning structure 242, which make the optical film 121 having no movement space after installation except for the installation direction.

As shown in FIG. 1 to FIG. 7, the present disclosure further provides a display panel, the display panel comprises a backlight module.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A backlight module, comprising:
a back plate; and
an optical component fixed on the back plate;
wherein a plurality of fool-proof structures are disposed on the optical component, a surface of the optical component is matched and fixed with the back plate;
wherein a positioning structure matched and fixed with the fool-proof structure is disposed on the back plate;
wherein the optical component comprises a main plate and support plates; each of the support plates protrudes from a side end of the main plate, and the support plates are symmetrically disposed on two side ends of the main plate;
wherein the fool-proof structure is disposed on each of the support plates;
wherein the fool-proof structure comprises a first recess and a first boss; the first boss and the first recess are parallelly disposed;
wherein the positioning structure comprises a second boss and a second recess; the second boss and the second recess are parallelly disposed;
wherein the first recess is matched and fixed with the second boss; the first boss is matched and fixed with the second recess, the first boss and the first recess are mutual dislocated from each other along a width direction of each of the support plates, the second boss and the second recess are mutual dislocated from each other along a width direction of each of the support plates, wherein, when in a stacked position with other optical components, the fool-proof structure on the optical component is in a different position from fool-proof structures on the other optical components.

2. The backlight module according to claim 1, wherein a height of the first boss is no more than a thickness of the back plate.

3. The backlight module according to claim 1, wherein the main plate comprises a first end and a second end; the first end of the main plate corresponds to a mounting starting end of the optical component, and the second end of the main plate corresponds to a mounting tail end of the optical component; the support plates are disposed on the first end of the main plate.

4. The backlight module according to claim 1, wherein the fool-proof structure is matched and fixed with the positioning structure, and the fool-proof structure is gap-less fitted with the positioning structure; the first boss and the second boss comprise first chamfers, a third end, a fourth end and a fifth end, the first chamfers are disposed on the third end of the first boss and the third end of the second boss; the first chamfer is slanted from the third end to the fourth end and the fifth end.

5. The backlight module according to claim 1, wherein a height of the first boss is no more than a depth of the second recess.

6. The backlight module according to claim 1, wherein a height of the second boss is no more than a depth of the first recess.

7. A backlight module, comprising:
a back plate; and
an optical component fixed on the back plate;
wherein a fool-proof structure is disposed on the optical component, a surface of the optical component is matched and fixed with the back plate;
wherein a positioning structure matched and fixed with the fool-proof structure is disposed on the back plate;
wherein the optical component comprises a main plate and support plates;
wherein each support plate protrudes from a side end of the main plate, and the support plates are symmetrically disposed on two side ends of the main plate;
wherein the fool-proof structure is disposed on each of the support plates;
wherein the main plate comprises a first end and a second end; the first end of the main plate corresponds to a mounting starting end of the optical component, and the second end of the main plate corresponds to a mounting tail end of the optical component; the support plates are disposed on the first end the main plate;
wherein the fool-proof structure comprises a first recess and a first boss; the first boss and the first recess are parallelly disposed, wherein a height of the first boss is no more than a thickness of the back plate;
wherein the positioning structure comprises a second boss and a second recess; the second boss and the second recess are parallelly disposed;
wherein the first recess is matched and fixed with the second boss; the first boss is matched and fixed with the second recess;
wherein the first recess is a through hole;
wherein a height of the first boss is equal to a depth of the second recess;
wherein a height of the second boss is equal to a depth of the first recess;
wherein the fool-proof structure is matched and fixed with the positioning structure, and the fool-proof structure is gap-less fitted with the positioning structure, the first boss and the first recess are mutual dislocated from each other along a width direction of each of the support plates, the second boss and the second recess are mutual dislocated from each other along a width direction of each of the support plates, wherein, when in a stacked position with other optical components, the fool-proof structure on the optical component is in a different position from fool-proof structures on the other optical components.

8. A display panel, comprising a backlight module, wherein the backlight module comprising:
a back plate; and
an optical component fixed on the back plate;
Wherein a fool-proof structure is disposed on the optical component, a surface of the optical component is matched and fixed with the back plate;
wherein a positioning structure matched and fixed with the fool-proof structure is disposed on the back plate, wherein the optical component comprises a main plate and support plates; each of the support plates protrudes from a side end of the main plate, and the support plates are symmetrically disposed on two side ends of the main plate;
wherein the fool-proof structure is disposed on each of the support plates;
wherein the fool-proof structure comprises a first recess and a first boss; the first boss and the first recess are parallelly disposed;
wherein the positioning structure comprises a second boss and a second recess; the second boss and the second recess are parallelly disposed;
wherein the first recess is matched and fixed with the second boss; the first boss is matched and fixed with the second recess, the first boss and the first recess are mutual dislocated from each other along a width direction of each of the support plates, the second boss and the second recess are mutual dislocated from each other along a width direction of each of the support plates, wherein, when in a stacked position with other optical components, the fool-proof structure on the optical component is in a different position from fool-proof structures on the other optical components.

9. The display panel according to claim 8, wherein a height of the first boss is no more than a thickness of the back plate.

10. The display panel according to claim 8, wherein the main plate comprises a first end and a second end; the first end of the main plate corresponds to a mounting starting end of the optical component, and the second end of the main plate corresponds to a mounting tail end of the optical component; the support plates are disposed on the first end of the main plate.

11. The display panel according to claim 8, wherein the fool-proof structure is matched and fixed with the positioning structure, and the fool-proof structure gap-less fitted with the positioning structure; the first boss and the second boss comprise first chamfers, a third end, a fourth end and a fifth end, the first chamfers are disposed on the third end of the first boss and the third end of the second boss; the first chamfer is slanted from the third end to the fourth end and the fifth end.

12. The display panel according to claim 8, wherein a height of the first boss is no more than a depth of the second recess.

13. The display panel according to claim 8, wherein a height of the second boss is no more than a depth of the first recess.

* * * * *